Figure 1:
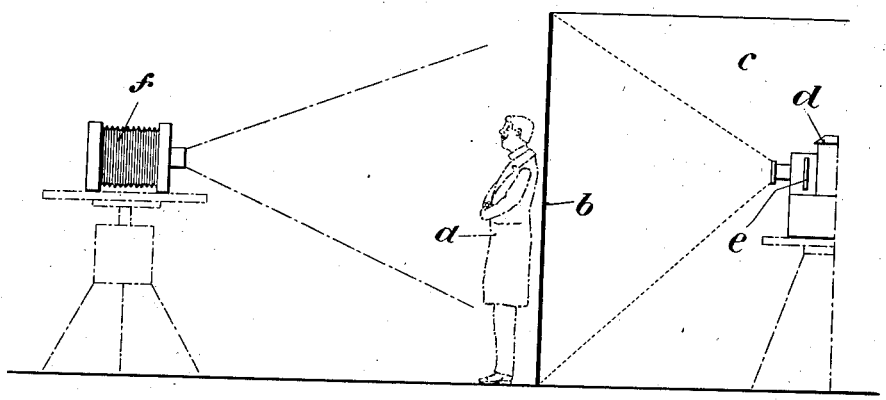

H. SONTAG.
PROCESS FOR PHOTOGRAPHING OBJECTS WITH PROJECTED BACKGROUNDS.
APPLICATION FILED MAR. 4, 1912.

1,053,887.

Patented Feb. 18, 1913.

UNITED STATES PATENT OFFICE.

HUGO SONTAG, OF ERFURT, GERMANY.

PROCESS FOR PHOTOGRAPHING OBJECTS WITH PROJECTED BACKGROUNDS.

1,053,887.  Specification of Letters Patent.  Patented Feb. 18, 1913.

Application filed March 4, 1912. Serial No. 681,552.

*To all whom it may concern:*

Be it known that I, HUGO SONTAG, a subject of the German Emperor, residing at Erfurt, Kingdom of Prussia, Germany, have invented certain new and useful Improvements in or Relating to Processes for Photographing Objects with Projected Backgrounds, of which the following is a specification.

My invention consists in a process for photographing and has for its object to provide for a method which enables a background to be projected from behind on a transparent screen, and the object and the back-ground projected to be photographed with only one exposure of the plate.

With these and other objects in view the invention consists in the picture forming the back-ground being projected on a screen slightly tinted with a non-actinic color or color having a weak actinic action, such as yellow, red, green or the like, the object to be photographed, suitably lighted, being in front of the said screen, and being photographed with the back-ground projected by a single exposure of the plate. The object can be lighted both by daylight and by artificial light. Owing to the transparent dull projection screen used for carrying out the process being slightly tinted with a non-actinic color or a color having a weak actinic action, such as yellow, red, green or a mixture of the said colors, the rays due to the lighting of the object, falling on the front side of the screen, are absorbed or rendered completely inactive, while the rays passing through the screen from behind and coming from the projector apparatus exercise their full action on the plate.

By a suitable adjustment of the projector apparatus and by insertion of colored disks or by the use of colored diapositives for the projecting apparatus, it is possible in carrying out the new process to obtain the most varied effects in the pictures obtained. It is at the same time possible to photograph directly both by daylight and by artificial light, the object and the projected background by a single exposure of the plate, and to combine on the plate the projected back-ground and the object in the most effective manner. The picture is photographed in the usual manner and with the same length of exposure, so that the advantages of working with a projected background are for the first time made accessible for practical purposes.

The arrangement of the apparatus used for carrying out the process is illustrated by way of example in the drawing in which—

Figure 2:
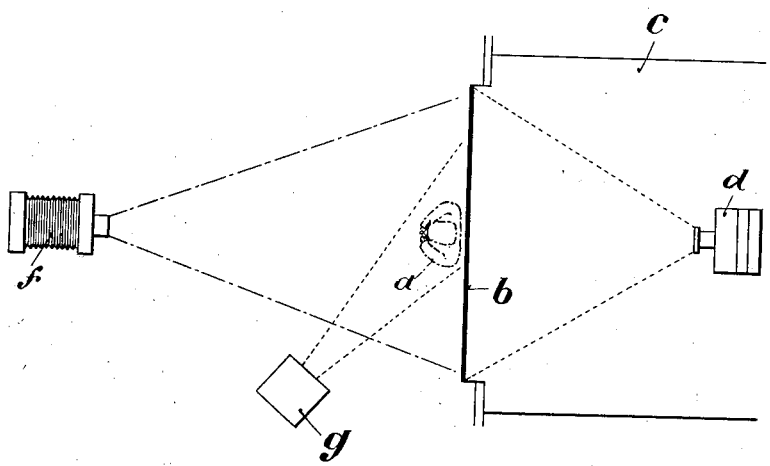

Figure 1 is a side elevation and Fig. 2 a plan.

The object to be photographed, for instance a person $a$, is disposed close in front of the projection screen $b$ which can be made of any suitable fabric, paper or glass plate, etc. In any case, the projection screen is slightly tinted with such a color that its chemical action is very weak, such as yellow, red, or green. A mixture of the said colors could also be used for coloring the projection screen. The projection screen is in front of a dark chamber $c$ in which is placed the projection apparatus $d$ which takes the diapositive $e$ to be projected. The object $a$ is suitably lighted by daylight and photographed simultaneously with the background projected on the screen $b$, by means of the apparatus $f$ by a single exposure of the photographic plate. In case of artificial lighting of the object $a$, the source of light $g$ is preferably arranged near the projection screen $b$, for instance laterally of the same, in well known manner (Fig. 2).

What I claim is:—

A process of photographing objects with any desired background which consists in projecting the background upon a translucent screen slightly tinted with a non-actinic color or a color having a weak actinic action located behind the object, lighting the face side of the object and subjecting the sensitized plate or film to a single exposure to simultaneously impress thereon the images of the said object and the projected background.

In testimony whereof I have hereunto set my hand in presence of two subscribing witnesses.

HUGO SONTAG.

Witnesses:
 THEOD. HOFFMANN,
 ERNST EBERHARDT.